(12) United States Patent
Mancini et al.

(10) Patent No.: US 7,716,931 B2
(45) Date of Patent: May 18, 2010

(54) METHOD AND APPARATUS FOR ASSEMBLING GAS TURBINE ENGINE

(75) Inventors: Alfred A. Mancini, Cincinnati, OH (US); David L. Burrus, Cincinnati, OH (US); Steven J. Lohmueller, Reading, OH (US)

(73) Assignee: General Electric Company, Schenectady, NY (US)

( * ) Notice: Subject to any disclaimer, the term of this patent is extended or adjusted under 35 U.S.C. 154(b) by 736 days.

(21) Appl. No.: 11/364,914

(22) Filed: Mar. 1, 2006

(65) Prior Publication Data
US 2010/0083664 A1    Apr. 8, 2010

(51) Int. Cl.
F02C 1/00 (2006.01)
(52) U.S. Cl. .............................. 60/748; 60/737; 60/752
(58) Field of Classification Search .................. 60/737, 60/738, 752, 758, 760, 804, 748
See application file for complete search history.

(56) References Cited

U.S. PATENT DOCUMENTS

| | | | | |
|---|---|---|---|---|
| 2,638,745 | A * | 5/1953 | Lewis | 60/748 |
| 4,129,985 | A * | 12/1978 | Kajita et al. | 60/39.37 |
| 4,301,657 | A * | 11/1981 | Penny | 60/748 |
| 4,339,924 | A | 7/1982 | White et al. | |
| 4,845,940 | A | 7/1989 | Beer | |
| 4,912,931 | A | 4/1990 | Joshi et al. | |
| 5,117,636 | A | 6/1992 | Bechtel, II et al. | |
| 5,253,478 | A | 10/1993 | Thibault, Jr. et al. | |
| 5,319,935 | A * | 6/1994 | Toon et al. | 60/733 |
| 5,575,154 | A | 11/1996 | Loprinzo | |
| 5,816,050 | A * | 10/1998 | Sjunnesson et al. | 60/748 |
| 6,253,538 | B1 * | 7/2001 | Sampath et al. | 60/776 |
| 6,427,446 | B1 | 8/2002 | Kraft et al. | |
| 6,430,932 | B1 | 8/2002 | Martling et al. | |
| 6,470,684 | B2 * | 10/2002 | Wilbraham | 60/737 |
| 6,691,515 | B2 * | 2/2004 | Verdouw et al. | 60/737 |
| 6,772,595 | B2 | 8/2004 | Martling et al. | |
| 6,844,520 | B2 | 1/2005 | D'Andrea et al. | |

(Continued)

FOREIGN PATENT DOCUMENTS

CN    1441194    9/2003

(Continued)

OTHER PUBLICATIONS

Chinese Office Action, dated Nov. 5, 2009, for copending Chinese Patent Application No. 200710084700.3 (14 pages).

*Primary Examiner*—Michael Cuff
*Assistant Examiner*—Phutthiwat Wongwian
(74) *Attorney, Agent, or Firm*—William Scott Andes, Esq.; Armstrong Teasdale LLP

(57) ABSTRACT

A method for assembling a gas turbine engine is provided. The method includes providing a combustor having a combustor liner assembly defining a combustion chamber. An outer combustor liner includes a radially extending first end that defines a combustion chamber input opening. An axially extending second end of the outer combustor liner defines a combustion chamber output opening. The first end transitions into the second end to form an arcuate cross-sectional shape of the outer combustor liner. A dome assembly is coupled to the first end of the combustor liner that extends downstream from the dome assembly. A fuel nozzle is positioned within a cyclone formed on the dome assembly and configured in a radial configuration.

8 Claims, 6 Drawing Sheets

U.S. PATENT DOCUMENTS

| | | |
|---|---|---|
| 7,051,532 B2 | 5/2006 | Howell et al. |
| 7,249,721 B2 * | 7/2007 | Niass et al. ............ 239/399 |
| 2004/0200223 A1 * | 10/2004 | Nguyen et al. ............ 60/722 |
| 2006/0277921 A1 * | 12/2006 | Patel et al. ............ 60/804 |
| 2008/0006033 A1 * | 1/2008 | Scarinci et al. ............ 60/776 |

FOREIGN PATENT DOCUMENTS

| | | |
|---|---|---|
| CN | 1676902 | 10/2005 |

\* cited by examiner

METHOD AND APPARATUS FOR ASSEMBLING GAS TURBINE ENGINE

BACKGROUND OF THE INVENTION

This invention relates generally to combustors and, more particularly, to gas turbine combustors.

Air pollution concerns worldwide have led to stricter emissions standards both domestically and internationally. Aircraft are governed by both Environmental Protection Agency (EPA) and International Civil Aviation Organization (ICAO) standards. These standards regulate the emission of oxides of nitrogen (NOx), unburned hydrocarbons (HC), and carbon monoxide (CO) from aircraft in the vicinity of airports, where they contribute to urban photochemical smog problems. In general, engine emissions fall into two classes: those formed because of high flame temperatures (NOx), and those formed because of low flame temperatures that do not allow the fuel-air reaction to proceed to completion (HC and CO).

At least some known gas turbine combustors include between 10 and 30 mixer assemblies, which mix high velocity air with a fine fuel spray. These mixer assemblies usually consist of a fuel nozzle located at a center of a swirler for swirling the incoming air to enhance flame stabilization and mixing. Both the fuel nozzle and the mixer assembly are located on a combustor dome. In conventional gas turbine combustion systems, the fuel nozzles are inserted into the dome assembly in an axial orientation. This approach leads to several drawbacks that must be dealt with during a combustor design phase. Axial configured fuel nozzles require an open volume upstream from the dome face to allow for the insertion and extraction of the fuel nozzle without removing the combustor. This additional volume or envelope adds extra length, cost and/or weight to the engine, without adding any benefit to the operation of the engine. Additionally, a long fuel nozzle stem is needed to connect the fuel nozzle tip to a flange of the dome assembly, which also adds cost and/or weight to the engine, and adversely affects the natural frequency of the fuel nozzle and/or the heat transfer within the fuel nozzle.

BRIEF DESCRIPTION OF THE INVENTION

In one aspect, the present invention provides a method for assembling a gas turbine engine. The method includes providing a combustor having a combustor liner assembly defining a combustion chamber. A radially extending first end of an outer combustor liner defines a combustion chamber input opening and an axially extending second end of the outer combustor liner defines a combustion chamber output opening. The first end transitions into the second end to form an arcuate cross-sectional shape of the outer combustor liner. A dome assembly is coupled to the first end of the combustor liner that extends downstream from the dome assembly. A fuel nozzle is positioned within a cyclone formed on the dome assembly and configured in a radial configuration.

In another aspect, the present invention provides a combustor for a gas turbine engine. The combustor includes a combustor liner assembly including an outer combustor liner defining at least a portion of a combustion chamber. The outer combustor liner has a radially extending first end defining a combustion chamber input opening and an axially extending second end defining a combustion chamber output opening. The first end transitions into the second end to define an arcuate cross-sectional shape of the combustor liner. A dome assembly is coupled to the first end extending downstream from the dome assembly. The dome assembly includes a cyclone having a plurality of cyclone vanes positioned circumferentially about the cyclone. A fuel nozzle is positioned within the cyclone in a radial configuration.

In another aspect, the present invention provides a gas turbine engine. The gas turbine engine includes a compressor defining a compressor discharge opening. A combustor is coupled to the compressor. The combustor includes a liner assembly defining a combustion chamber. An outer combustor liner of the liner assembly has a radially extending first end that defines a combustion chamber input opening and an axially extending second end that defines a combustion chamber output opening. A dome assembly is coupled to the first end. The dome assembly includes a cyclone having a plurality of cyclone vanes positioned circumferentially about the cyclone. A fuel nozzle is positioned within the cyclone in a radial configuration. The gas turbine engine further includes a turbine nozzle assembly coupled to the combustor.

DETAILED DESCRIPTION OF THE INVENTION

Figure 1:
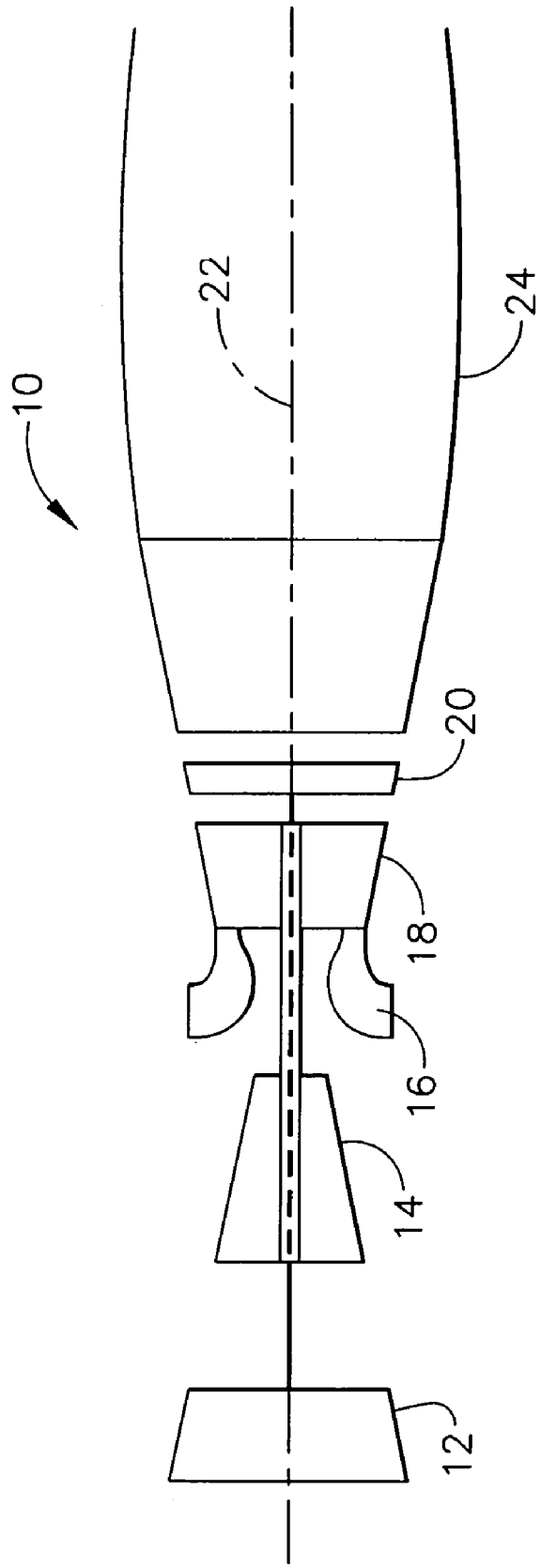
FIG. 1 is a schematic view of an exemplary gas turbine engine.

FIG. 1 is a schematic view of a gas turbine engine 10 including a low pressure compressor 12, a high pressure compressor 14 and a combustor 16. Gas turbine engine 10 also includes a high pressure turbine 18 and a low pressure turbine 20.

In operation, air flows through low pressure compressor 12 and compressed air is supplied from low pressure compressor 12 to high pressure compressor 14. The highly compressed air is delivered to combustor 16. Airflow (not shown in FIG. 1) from combustor 16 drives turbines 18 and 20 about a longitudinal axis 22 of gas turbine engine 10.

Figure 2:
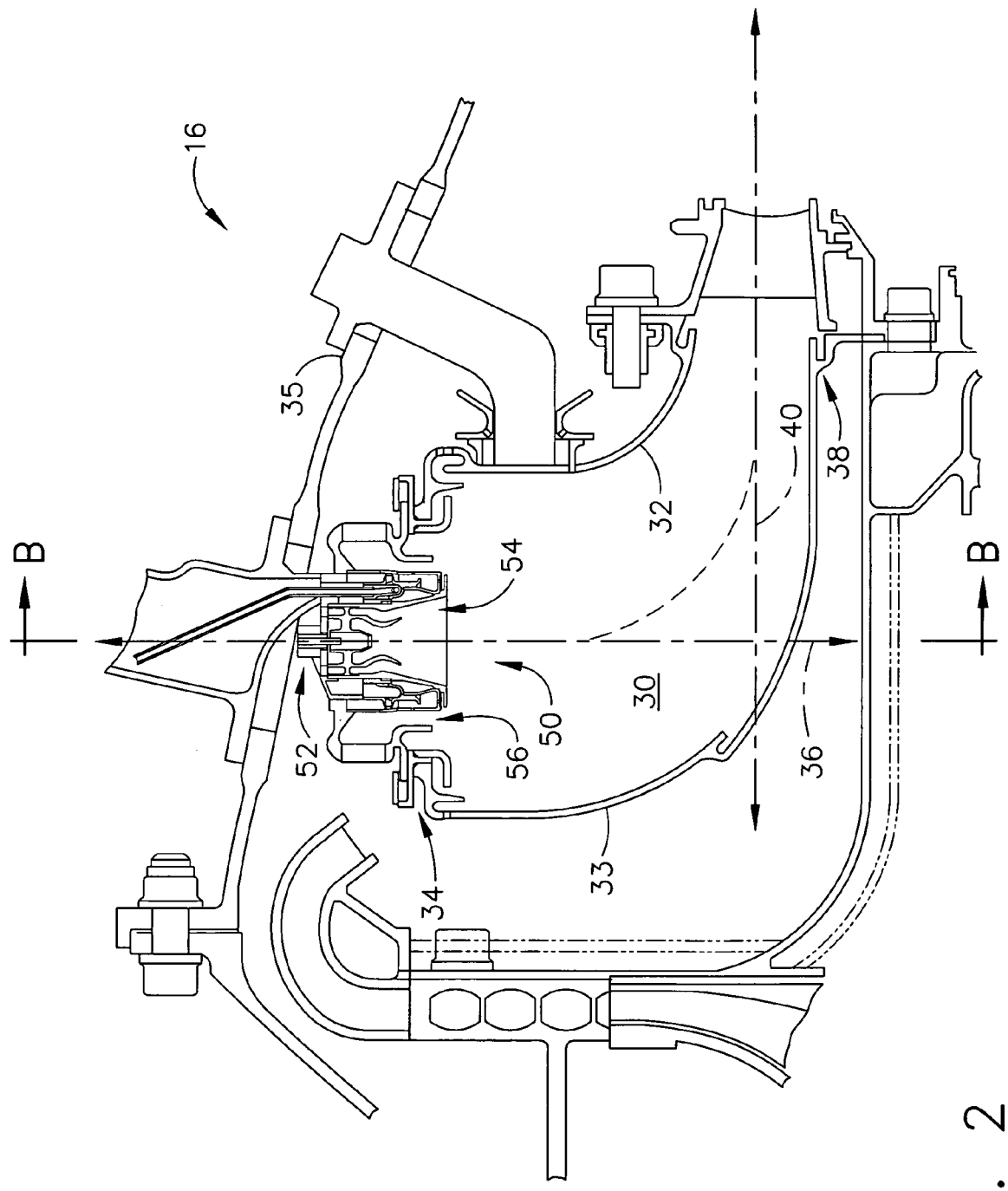
FIG. 2 is a sectional view of a combustor that may be used with the gas turbine engine shown in FIG. 1.
Figure 3:
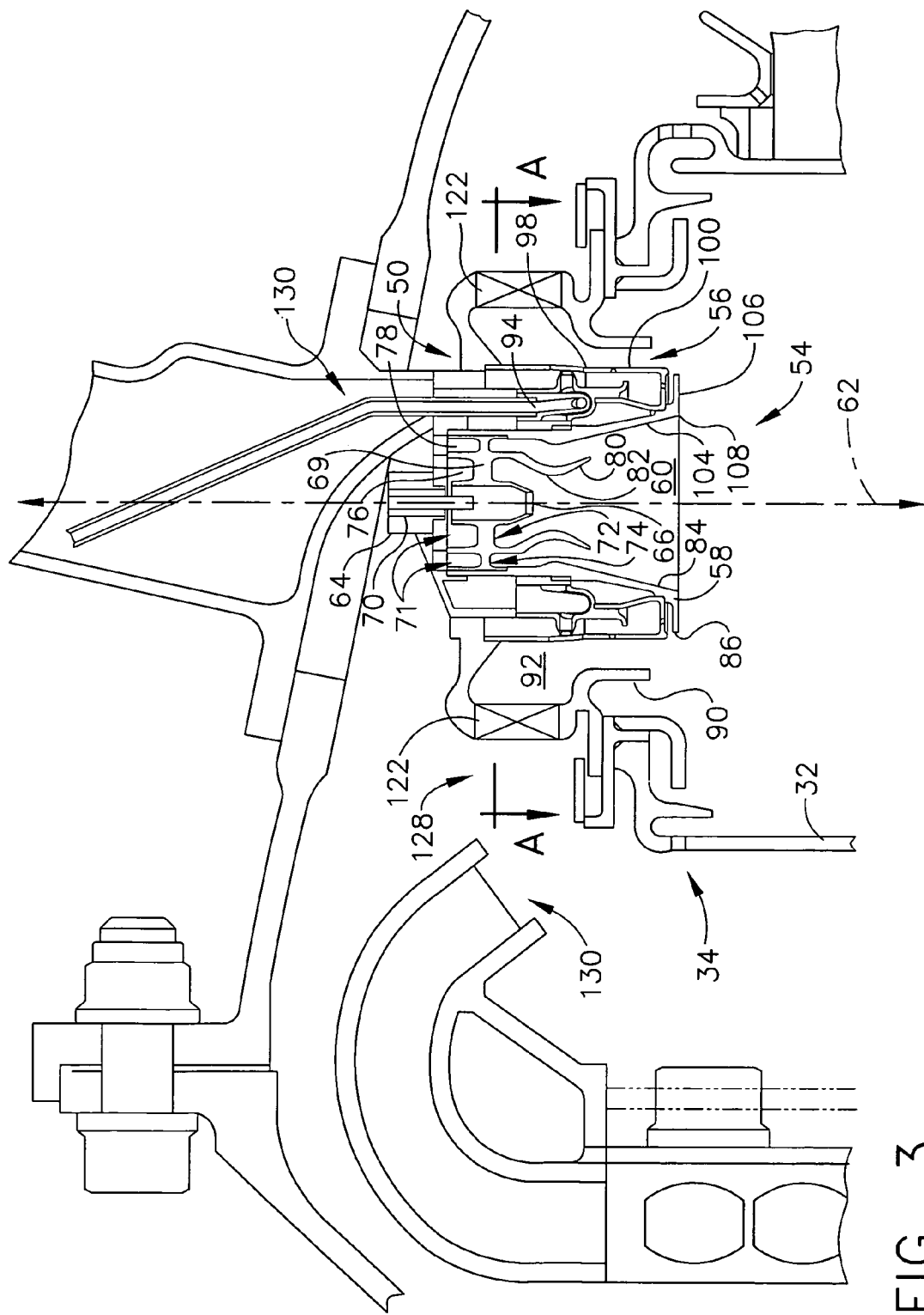
FIG. 3 is an enlarged view of a portion of the combustor shown in FIG. 2.

FIG. 2 is a sectional view of combustor 16 for use with a gas turbine engine, similar to gas turbine engine 10 shown in FIG. 1. FIG. 3 is an enlarged sectional view of combustor 16 shown in FIG. 2. In one embodiment, gas turbine engine 10 is a CFM engine available from CFM International. In another embodiment, gas turbine engine 10 is a GE90 engine available from General Electric Company, Cincinnati, Ohio.

Each combustor 16 includes a combustion zone or chamber 30 defined by annular, radially outer liner 32 and a radially inner liner 33. More specifically, outer liner 32 defines an outer boundary of combustion chamber 30, and inner liner 33 defines an inner boundary of combustion chamber 30. Outer liner 32 and inner liner 33 are radially inward from an annular combustor casing 35 which extends circumferentially around liners 32 and 33.

As shown in FIG. 2, outer liner 32 and inner liner 33 define a first or input end 34 positioned circumferentially about a radial axis 36 of chamber 30 and extending in a radial direction with respect to longitudinal axis 22 of gas turbine engine 10. Outer liner 32 and inner liner 33 further define a generally opposing output end 38 positioned circumferentially about a longitudinal axis 40 of chamber 30, substantially perpendicular to radial axis 36 and parallel to and extending in an axial direction with respect to longitudinal axis 22. As shown in FIG. 2, chamber 30 has an arcuate shape and input end 34 transitions into output end 38 to direct combustion gases through chamber 30 from radially extending input end 34 to axially extending output end 38. In alternative embodiments, chamber 30 is defined by outer liner 32 and inner liner 33 such that input end 34 is configured between an angle substantially parallel to longitudinal axis 40 and an angle substantially parallel to radial axis 36, as shown in FIG. 2, and output end 38 is positioned circumferentially about longitudinal axis 40 of chamber 30.

Combustor 16 also includes an annular dome assembly 50 mounted with respect to input end 34, as shown in FIGS. 2 and 3. Dome assembly 50 defines an upstream end of combustion chamber 30 and mixer assemblies 52 are spaced circumferentially around dome assembly 50 to deliver a mixture of fuel and air to combustion chamber 30.

Each mixer assembly 52 includes a pilot mixer 54, a main mixer 56, and a centerbody 58 extending therebetween. Centerbody 58 defines a chamber 60 that is in flow communication with, and downstream from, pilot mixer 54. Chamber 60 has an axis of symmetry 62 at the upstream end coaxial with radial axis 36 of combustor 16. A pilot fuel nozzle 64 extends into chamber 60 and is mounted symmetrically with respect to axis of symmetry 62. Pilot fuel nozzle 64 includes a pilot fuel injector 66 for dispensing droplets of fuel into pilot chamber 60. In one embodiment, pilot fuel injector 66 supplies fuel through injection jets (not shown). In an alternative embodiment, pilot fuel injector 66 supplies fuel through injection simplex sprays (not shown).

Pilot mixer 54 also includes a pair of concentrically mounted swirlers 71. More specifically, swirlers 71 are axial swirlers and include a pilot inner swirler 72 and a pilot outer swirler 74. Pilot inner swirler 72 is annular and is circumferentially disposed around pilot fuel injector 66. Each swirler 72 and 74 includes a plurality of vanes 76 and 78, respectively, positioned upstream from pilot fuel injector 66. Vanes 76 and 78 are selected to provide desired ignition characteristics, lean stability, and low carbon monoxide (CO) and hydrocarbon (HC) emissions during low engine power operations.

A pilot splitter 80 is positioned between pilot inner swirler 72 and pilot outer swirler 74, and extends downstream from pilot inner swirler 72 and pilot outer swirler 74. More specifically, pilot splitter 80 is annular and extends circumferentially around pilot inner swirler 72 to separate airflow flowing through inner swirler 72 from airflow flowing through outer swirler 74. Splitter 80 has a converging-diverging inner surface 82, which provides a fuel-filming surface during engine low power operations. The convergent surface of splitter 80 increases axial air velocity to prevent the flame-front from moving upstream of the throat of the venturi and thus protects the tip from excess radiant heat flux and coking, while the divergent surface of splitter 80 reduces a velocity of air flowing through pilot mixer 54 to allow recirculation of hot gases.

Pilot outer swirler 74 is radially outward from pilot inner swirler 72, and radially inward from an inner surface 84 of centerbody 58. More specifically, pilot outer swirler 74 extends circumferentially around pilot inner swirler 72 and is positioned between pilot splitter 80 and pilot housing 86. In one embodiment, pilot inner swirler vanes 76 swirl air flowing therethrough in the same direction as air flowing through pilot outer swirler vanes 78. In another embodiment, pilot inner swirler vanes 76 swirl air flowing therethrough in a first direction that is opposite a second direction that pilot outer swirler vanes 78 swirl air flowing therethrough.

Main mixer 56 includes an annular main housing 90 that defines an annular cavity 92. Main mixer 56 is concentrically aligned with respect to pilot mixer 54 and extends circumferentially around pilot mixer 54. A fuel manifold 94 extends between pilot mixer 54 and main mixer 56. More specifically, fuel manifold 94 extends circumferentially around pilot mixer 54 and is between centerbody 58 and main housing 90. Fuel manifold 94 includes a plurality of injection ports 98 penetrating through exterior surface 100 of housing 90 for injecting fuel radially outwardly from fuel manifold 94 into main mixer cavity 92. Fuel injection ports 98 facilitate circumferential fuel-air mixing within main mixer 56.

In one embodiment, manifold 94 includes a pair of rows of circumferentially-spaced injection ports 98. In another embodiment, manifold 94 includes a plurality of injection ports 98 that are not arranged in circumferentially-spaced rows. A location of injection ports 98 is selected to adjust a degree of fuel-air mixing to achieve low nitrous oxide (NOx) emissions and to insure complete combustion under variable engine operating conditions. Further, the injection port location is also selected to facilitate reducing or preventing combustion instability.

Centerbody 58 separates pilot mixer 54 and main mixer 56. Accordingly, pilot mixer 54 is sheltered from main mixer 56 during pilot operation to facilitate improving pilot performance stability and efficiency, while also reducing CO and HC emissions. Further, centerbody 58 is shaped to facilitate completing a burnout of pilot fuel injected into combustor 16. More specifically, inner wall 84 of centerbody 58 includes a converging-diverging surface 104, an aft shield 106 and a lip 108 that extends outwardly therebetween and facilitates controlling diffusion and mixing of the pilot flame into airflow exiting main mixer 56. An orientation of lip 108 is variably selected to facilitate improving ignition characteristics, combustion stability at high and lower power operations, and emissions generated at lower power operating conditions.

Figure 4:
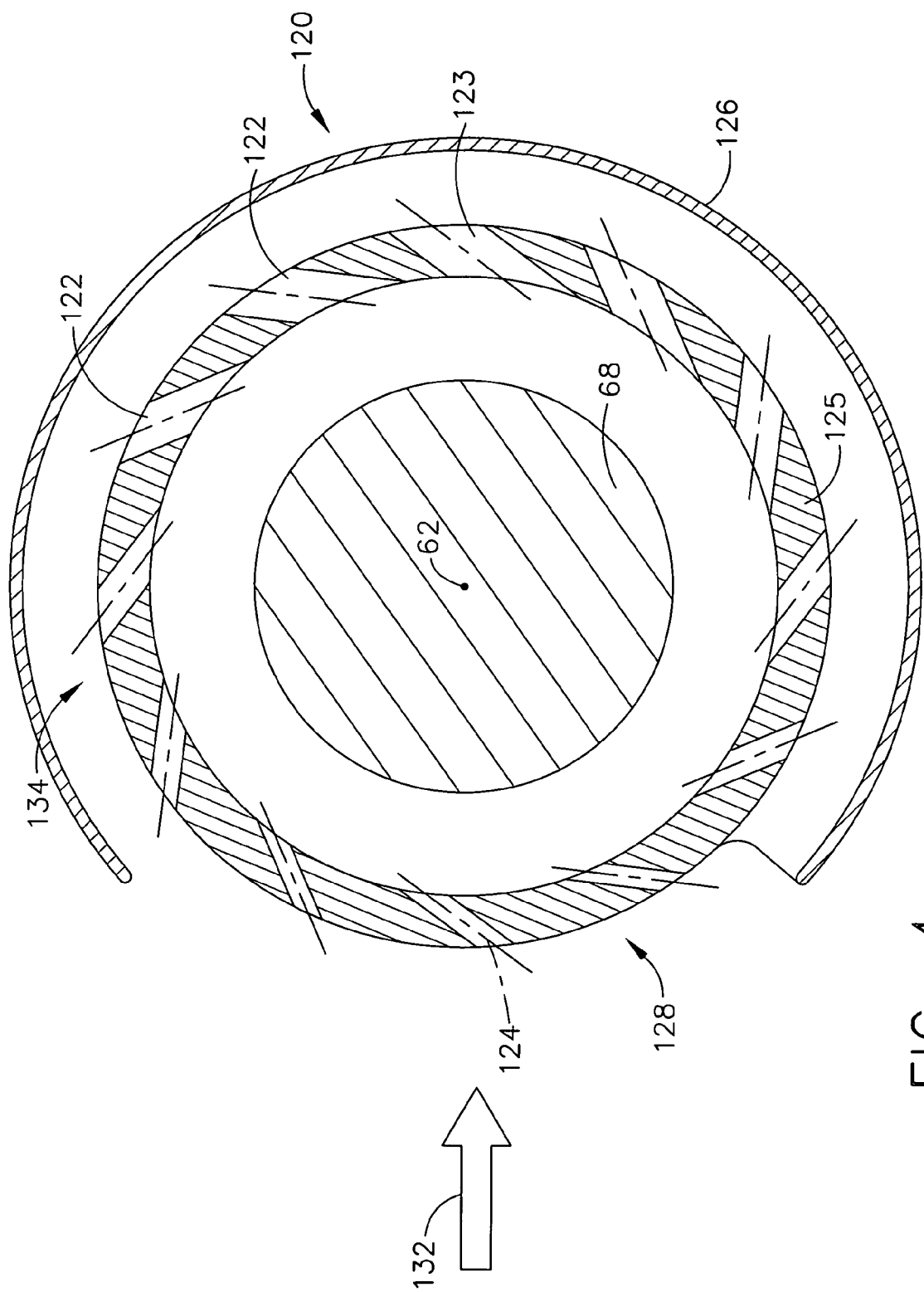
FIG. 4 is a sectional view of the portion of the combustor shown in FIG. 3 along sectional line A-A.

In one embodiment as shown in FIG. 4, dome assembly 50 includes a cyclone 120 having a plurality of cyclone vanes 122 positioned circumferentially about cyclone 120. As shown in FIG. 4, in a particular embodiment, an aft most cyclone vane 123 is larger than a forward most cyclone vane 124. A size of adjacent cyclone vanes 122 decreases from aft most cyclone vane 123 to forward most cyclone vane 124. Cyclone 120 includes a cyclone body 125. A shroud 126 is configured to surround at least a portion of body 125 to define a void or passage 128 in flow communication with a compressor discharge opening 130 (as shown in FIG. 3) positioned upstream of combustor 16. As shown by reference arrow 132, air flows out of compressor discharge opening 130 through passage 128 and into cyclone 120. Shroud 126 and, more specifically, passage 128 is configured to capture air exiting compressor discharge opening 130 to facilitate a uniform air feed into cyclone vanes 122. In this embodiment, shroud 126 is integrally formed with cyclone 120 to control a dimension of gap 134. Body 125 and shroud 126 are coaxially positioned about a radial axis of combustor 16, such as axis of symmetry 62, and define a gap 134 having a uniform radial dimension about a circumference or outer periphery of body 125. Alternatively, shroud 126 is fabricated as a separate or independent component or piece and coupled to dome assembly 50 to define gap 134 having a radial dimension that varies about a circumference of body 125.

Figure 5:
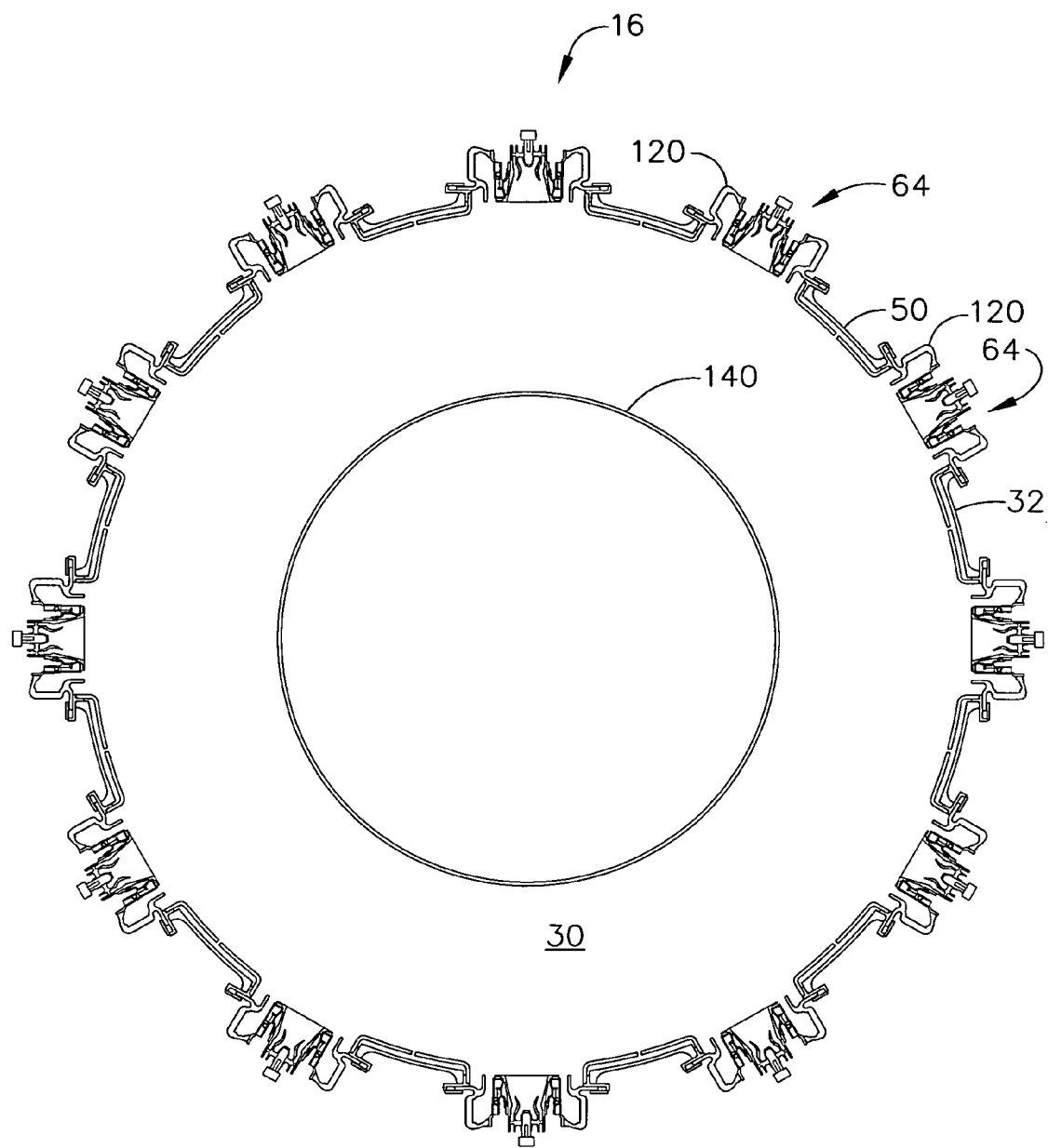
FIG. 5 is a sectional view of a mixer assembly for the combustor shown in FIG. 2 along sectional line B-B.

Referring further to FIG. 3, in one embodiment fuel nozzle 64 forms a fuel nozzle tip 68 having a forward end portion coupled to a mounting flange 69 formed on or coupled to dome assembly 50. An opposing fuel nozzle stem 70 is coupled to cyclone 120 and configured in flow communication with a diffuser. A flow of air is directed towards a pilot air passage defined within fuel nozzle tip 68. As shown in FIG. 3, in one embodiment fuel nozzle 64 is positioned within cyclone 120 in a generally radial configuration. In a radial configuration, fuel nozzle 64 may be positioned along axis of symmetry 62, as shown in FIG. 5. As shown in FIG. 5, fuel nozzle 64 is inserted into cyclone 120 in a substantially radial orientation. Air flows through dome assembly 50 and inlet end 34 into chamber 30 in a radial direction, and exits chamber 30 at outlet end 38 in an axial direction.

Figure 6:
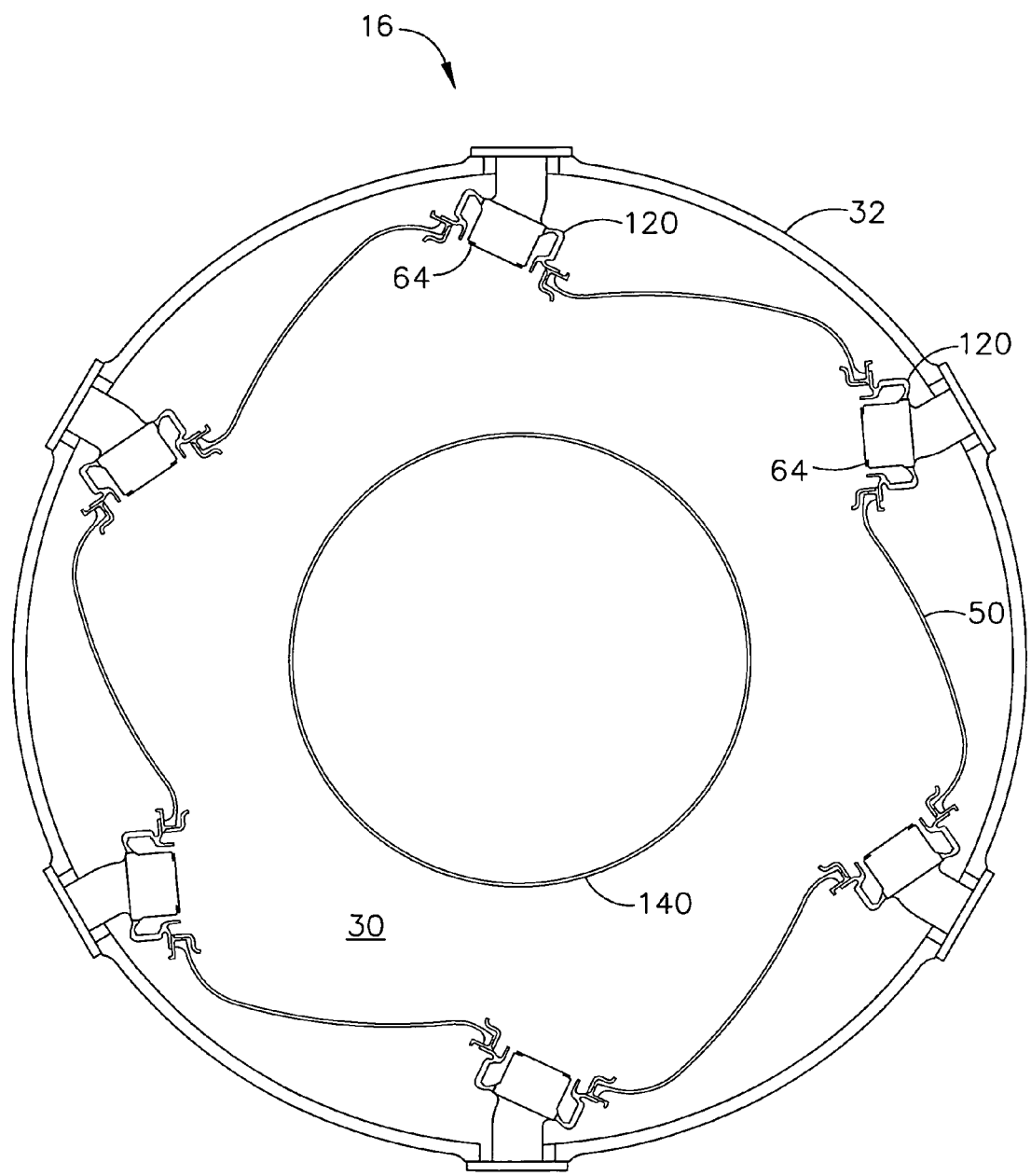
FIG. 6 is a sectional view of an alternative mixer assembly for the combustor shown in FIG. 2 along sectional line B-B.

In an alternative embodiment, fuel nozzle 64 may be positioned in a generally radial configuration and including a circumferential component, such as shown in FIG. 6. Referring to FIG. 6, with fuel nozzle 64 positioned in a generally radial configuration having a circumferential component, at least a portion of fuel nozzle 64 is positioned within combustion chamber 30 and directed at an inner combustor liner 140 at an indirect angle of incidence. In this embodiment, a greater distance between nozzle tip 68 (not shown in FIG. 6) and inner liner 140 and the indirect angle of incidence, facilitates an improvement in inner liner durability. As a result of this configuration, a bulk swirl is added to combustor 16 and an effective burner length is increased, which facilitates an improvement in emissions and an improved profile/pattern factor.

A fuel conduit 130 conveys fuel from fuel nozzle valve discharge ports (not shown), or directly from fuel nozzle inlet fittings, if valves are not used, to combustor 16 via pilot and main injectors and includes a pilot fuel circuit (not shown) and a main fuel circuit (not shown). The pilot fuel circuit supplies fuel to pilot fuel injector 66 and the main fuel circuit supplies fuel to main mixer 56 and includes a plurality of independent fuel stages used to control nitrous oxide emissions generated within combustor 16. The fuel conduit provides high thermal conductivity between the pilot and main circuits to allow one to cool the other for different pilot/main flow splits to minimize fuel thermal deposits (coking). To further minimize coking, the main circuit fuel-wetted wall geometries are aerodynamically smooth, contoured, and devoid of stagnant pockets or flow separation, such that when main fuel flow is shut off by upstream valves, air purge may be used to quickly and effectively remove liquid fuel from the circuit with very little residual fuel remaining. The main fuel circuit network and static air pressures at the injection orifice discharge points are designed to insure each leg of the circuit is effectively air purged when main flow is shut-off.

In operation, as gas turbine engine 10 is started and operated at idle operating conditions, fuel and air are supplied to combustor 16. During gas turbine idle operating conditions, combustor 16 uses only pilot mixer 54 for operating. The pilot fuel circuit injects fuel to combustor 16 through pilot fuel injector 66. Simultaneously, airflow enters pilot swirlers 71 and cyclone vanes 122. The pilot airflow flows substantially parallel to center mixer axis of symmetry 62 and strikes pilot splitter 80 which directs the pilot airflow in a swirling motion towards fuel exiting pilot fuel injector 66. More specifically, the airflow is directed into the pilot flame zone downstream from pilot mixer 54 by lip 108. The pilot airflow does not collapse a spray pattern (not shown) of pilot fuel injector 66, but instead stabilizes and atomizes the fuel. Airflow discharged through main mixer 56 is channeled into combustion chamber 30 in a radial direction.

As gas turbine engine 10 is accelerated from idle operating conditions to increased power operating conditions, additional fuel and air are directed into combustor 16. In addition to the pilot fuel stage, during increased power operating conditions, main mixer 56 is supplied fuel with main fuel circuit 134 and injected radially outward with fuel injection ports 98. Cyclone vanes 122 facilitate radial and circumferential fuel-air mixing to provide a substantially uniform fuel and air distribution for combustion. More specifically, radial penetration of fuel injected through injection ports 98, as a result of the different between fuel pressure in manifold 94 and air pressure in mixer cavity 92, and airflow exiting cyclone vanes 122, forces the radially penetrating fuel to extend circumferentially within main mixer cavity 92 to facilitate fuel-air mixing and to enable main mixer 56 to operate with a lean air-fuel mixture. In addition, uniformly distributing the fuel-air mixture facilitates obtaining a complete combustion to reduce high power operation $NO_x$ emissions.

The above-described combustor configuration provides improvements to the engine system, the combustor and the fuel nozzle configuration. The combustor configuration of this invention provides a compact engine due to the decrease in a length of the combustor. By reducing the combustor length and, thus, the length of the engine, the weight of the engine is reduced. Further, the shortened length of the rotor shaft facilitates improvement in shaft dynamics.

Additionally, the combustor configuration of the present invention provides a longer effective burner length for a corresponding combustor length. A longer burner length improves the performance of the combustor. In a particular embodiment, the radial TAPS design according to the present invention, as shown in FIG. 2, provides a burner length of about 4.34 inches, compared to a burner length of about 2.95 inches for a conventional axial TAPS design within an identical engine envelope. The increased burner length of the radial TAPS mixer overcomes limiting factors including, without limitation, overheating of the inner liner and poor exit temperature profile, by providing superior fuel/air mixing of a higher percentage of combustion air, without the loss of lean blow-out margin, starting performance and/or low power efficiencies.

Further, the present invention provides a fuel nozzle having a shorter stem connecting the flange to the fuel nozzle tip. The shorter stem reduces the weight of the fuel nozzle and a surface area exposed to hot gases, which will further reduce the heat transferred by the fuel. The reduced heat transfer will decrease a risk of coking within the fuel nozzle. Also, a shorter stem facilitates a decrease in fuel circuit volume. Therefore, less fuel is purged on shutdown and shorter fill times are required when turning a circuit on, which improves the engine acceleration response time.

While the invention has been described in terms of various specific embodiments, those skilled in the art will recognize that the invention can be practiced with modification within the spirit and scope of the claims.

What is claimed is:

1. A combustor for a gas turbine engine, said combustor comprising:

a combustor liner assembly comprising an outer combustor liner defining at least a portion of a combustion chamber, said outer combustor liner having a radially extending first end defining a combustion chamber input opening and an axially extending second end defining a combustion chamber output opening, said first end transitioning into said second end to define an arcuate cross-sectional shape of said combustor liner;

a dome assembly coupled to said first end, said first end extending downstream from said dome assembly, said dome assembly comprising a cyclone positioned in flow communication with a discharge opening of a compressor of the gas turbine engine, said cyclone having a plurality of cyclone vanes positioned circumferentially about said cyclone, said cyclone vanes configured to direct a flow of compressed air from the compressor into a fuel-air mixer cavity, wherein a flow passage of an aft most cyclone vane of said plurality of cyclone vanes is larger than a flow passage of a forward most cyclone vane of said plurality of cyclone vanes; and a fuel nozzle positioned within the cyclone in a radial configuration.

2. A combustor in accordance with claim 1 wherein said cyclone further comprises:

a body; and a shroud surrounding at least a portion of said body, said shroud defining a passage in flow communication with a compressor discharge opening positioned upstream of said combustor.

3. A combustor in accordance with claim 2 wherein said body and said shroud are coaxially positioned about a radial axis of said combustor, and define a gap having a uniform radial dimension about a circumference of said body.

4. A combustor in accordance with claim 1 wherein a size of each adjacent cyclone vane of said plurality of cyclone vanes increases from said forward most cyclone vane to said aft most cyclone vane.

5. A combustor in accordance with claim 1 wherein said fuel nozzle further comprises:

a fuel nozzle tip having a forward end portion coupled to a mounting flange; and an opposing fuel nozzle stem coupled to said cyclone, said fuel nozzle stem configured in flow communication with a diffuser and directing an airflow towards a pilot air passage defined within said fuel nozzle tip.

6. A gas turbine engine comprising:

a compressor defining a compressor discharge opening;

a combustor coupled to said compressor, said combustor comprising:

a liner assembly defining a combustion chamber, an outer combustor liner of said liner assembly having a radially extending first end defining a combustion chamber input opening and an axially extending second end defining a combustion chamber output opening;

a dome assembly coupled to said first end, said dome assembly comprising a cyclone positioned in flow communication with a discharge opening of the compressor discharge opening, said cyclone having a plurality of cyclone vanes positioned circumferentially about said cyclone, said cyclone vanes configured to direct a flow of compressed air from the compressor into a fuel-air mixer cavity, wherein a flow passage of an aft most cyclone vane of said plurality of cyclone vanes is larger than a flow passage of a forward most cyclone vane of said plurality of cyclone vanes; and a fuel nozzle positioned within the cyclone in a radial configuration; and a turbine nozzle assembly coupled to said combustor.

7. A gas turbine engine in accordance with claim 6 wherein said dome assembly further comprises a shroud surrounding at least a portion of a body of said cyclone, said shroud defining a passage in flow communication with said compressor discharge opening.

8. A gas turbine engine in accordance with claim 6 further comprising a combustor casing coupled to and positioned radially outwardly from said combustor.

* * * * *